W. L. COLLINS.
METALLIC REINFORCEMENT FOR WALLS.
APPLICATION FILED JAN. 16, 1911.
1,011,583.
Patented Dec. 12, 1911.
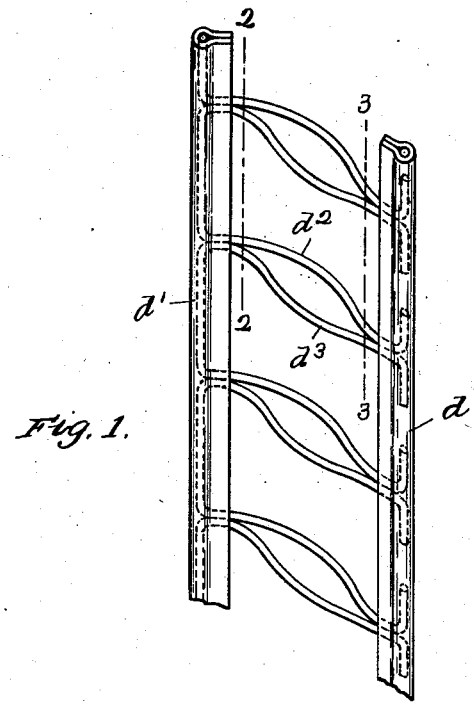
Fig. 1.
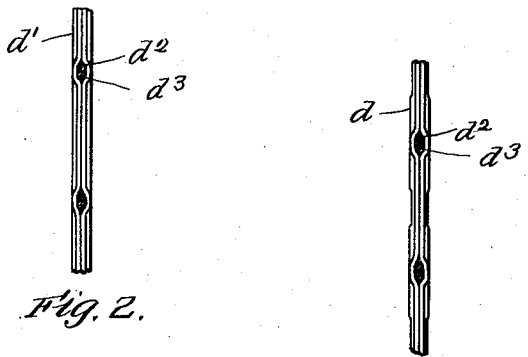
Fig. 2.
Fig. 3.
Witnesses:
H. B. Davis.
Cynthia Doyle.
Inventor:
Walter L. Collins
by Hayes & Harriman
attys.

UNITED STATES PATENT OFFICE.

WALTER L. COLLINS, OF MILFORD, MASSACHUSETTS.

METALLIC REINFORCEMENT FOR WALLS.

1,011,583.   Specification of Letters Patent.   Patented Dec. 12, 1911.

Original application filed August 1, 1910, Serial No. 574,768. Divided and this application filed January 16, 1911. Serial No. 602,781.

*To all whom it may concern:*

Be it known that I, WALTER L. COLLINS, residing at Milford, in the county of Worcester and State of Massachusetts, have invented an Improvement in Metallic Reinforcements for Walls, of which the following is a specification.

This application is a division of my application #574,768, filed August 1, 1910.

This invention has for its object to construct a metallic corner reinforcement adapted for use in the wall of my aforesaid application which may be easily and cheaply manufactured and is very strong and durable.

Figure 1 is a front elevation of a corner reinforcement embodying this invention. Figs. 2 and 3 are sectional details of the same taken on the dotted lines 2—2 and 3—3, respectively, of Fig. 1.

The metallic corner reinforcement here shown for the purpose of illustrating my invention consists of a corner bead $d$, composed of a flat strip of sheet metal folded upon itself and a similarly constructed bead $d'$, and double wire struts $d^2$, $d^3$, arranged in sets and connecting said beads together. The strut wires $d^2$ have an outward curve and the strut wires $d^3$ have an inward curve, and said wires are arranged in pairs and connected at their ends to the folded beads $d$ and $d'$. The ends of said strut wires are bent at right angles to their bodies, so as to occupy positions between the folds of the beads $d$ and $d'$ for convenience in manufacture. The strut wires $d^2$ and $d^3$ may be formed in a single piece. The connecting struts thus formed of wires are here shown as bent at an angle so that the bead $d'$ may occupy a horizontal position and the bead $d$ may extend in a diagonal direction toward and to the corner, where it is exposed. In such embodiment of my invention the bead $d$, is arranged at the side of and in a plane in front of the bead $d'$.

The reinforcements herein described may be embedded in the plaster of a lath and plaster wall with the bead $d'$ at the back side thereof and the bead $d$ at the front side thereof, and when the connecting wire struts are bent at an angle said reinforcements will extend in a diagonal direction from back to front.

By bending the strut wires some inward and others outward, as here shown, great stiffness is given to the reinforcing strip, which is important when the bead $d$ is exposed, as in such case a severe pressure or blow on the bead $d$ would not act to distort the strip or parts composing it and thereby cause the plaster to crumble.

I claim:—

1. A metallic reinforcement for walls consisting of two side strips, and double wire struts arranged between them and connected at their ends thereto, each strut comprising a pair of wires, one having an outward curve and the other an inward curve in the portion extending between said strips, substantially as described.

2. A metallic reinforcement for walls consisting of two strips of sheet metal folded upon themselves, and arranged at an angle with respect to each other, and double wire struts arranged between them and connected at their ends thereto, each strut comprising a pair of wires, one having an outward curve and the other an inward curve in the portion extending between said strips, substantially as described.

In testimony whereof, I have signed my name to this specification in the presence of two subscribing witnesses.

WALTER L. COLLINS.

Witnesses:
B. J. NOYES,
H. B. DAVIS.

---

Copies of this patent may be obtained for five cents each, by addressing the "Commissioner of Patents, Washington, D. C."